Oct. 2, 1956 — N. B. HANSON — 2,765,157
SILAGE CHOPPING DEVICE
Filed May 5, 1952 — 2 Sheets-Sheet 1
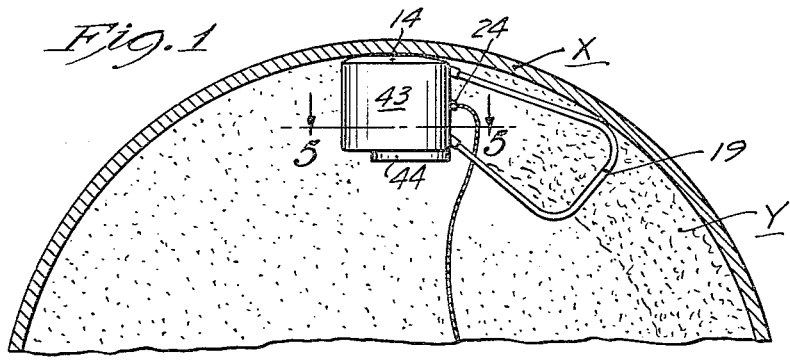
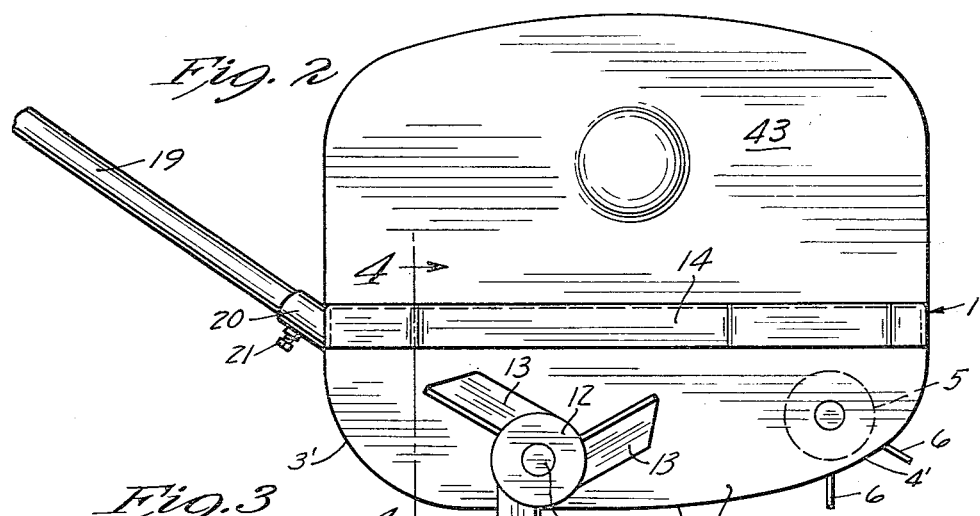
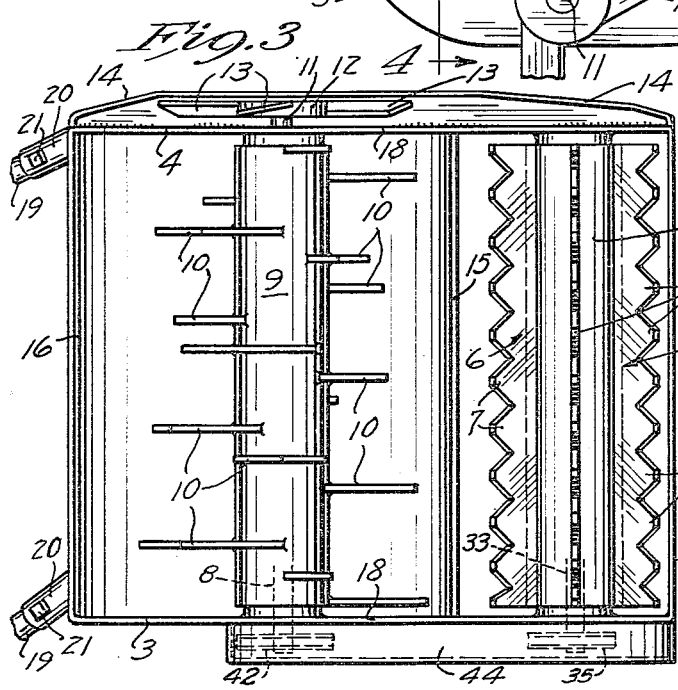
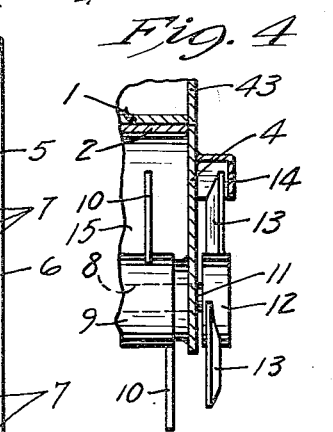
INVENTOR.
Newell B. Hanson
BY Merchant & Merchant
ATTORNEYS Oct. 2, 1956 N. B. HANSON 2,765,157
SILAGE CHOPPING DEVICE
Filed May 5, 1952 2 Sheets-Sheet 2
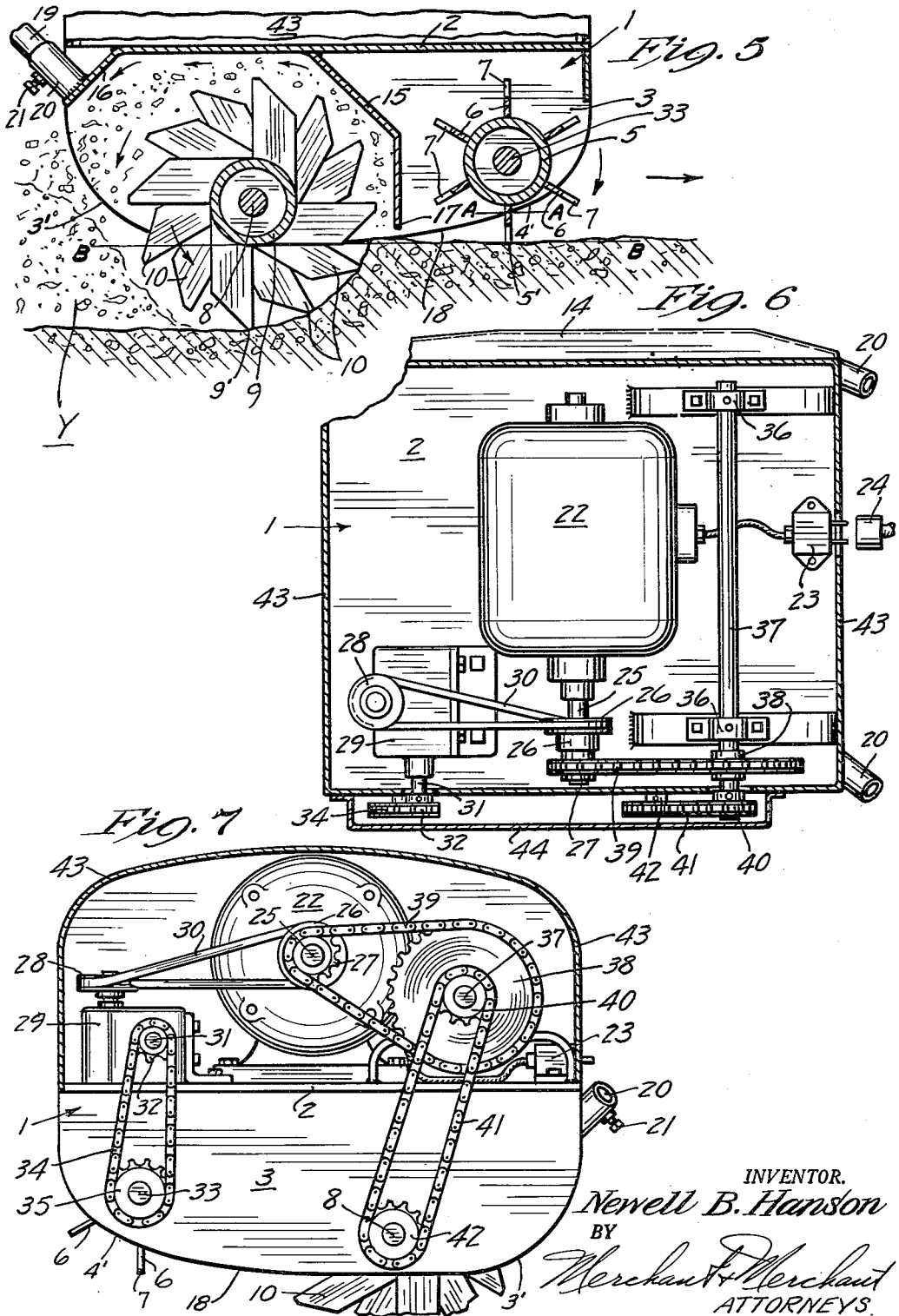
INVENTOR.
Newell B. Hanson
BY
Merchant & Merchant
ATTORNEYS.

United States Patent Office 2,765,157
Patented Oct. 2, 1956

2,765,157

SILAGE CHOPPING DEVICE

Newell B. Hanson, Lake Lillian, Minn.

Application May 5, 1952, Serial No. 286,084

3 Claims. (Cl. 262—20)

My invention relates to silage chopping devices, and more specifically to power-driven silage chopping machines.

In silage choppers heretofore invented and produced it has not been possible to work right up to the cylindrical walls of the silo. The result has been that as the chopper works its way downwardly through the frozen or otherwise packed silage, an annular cuff of silage remains in engagement with the silo wall. This cuff must be manually broken away from the wall in order to salvage same.

The primary object of my invention is the provision of a device which will remove all of the silage in a silo and leave none thereof in engagement with the side walls.

A still further object of my invention is the provision of a silage chopper which is self-powered and self-propelled—the same being equipped with handle means which is utilized solely as a guide.

A still further object of my invention is the provision of a device of the class described which will work right up to and hug the walls of a silo and clean all the silage therefrom without damaging the machine or the walls of said silo.

Another object of my invention is the provision of a machine which will finely chop up frozen corn silage or packed hay silage, or the like, which is portable and of such dimensions that it can be moved through standard silo doors without disassembly, except for the guide handles thereof.

Another object of my invention is the provision of novel means for imparting self-propelling movements to the device while the same is chopping and depositing silage rearwardly of the machine.

A still further object of my invention is the provision of a device having an inboard chopping rotor and an outboard chopping rotor, the latter of which is provided with circumferentially-spaced chopping blades which enable the machine to work into close engagement with the cylindrical wall of a silo.

The above and still further objects and advantages of my invention will become apparent from the following detailed specification, appended claims, and attached drawings.

Referring to the drawings, wherein like characters indicate like parts throughout the several views:

Fig. 1 is a view in top plan showing my chopper in operation against the cylindrical wall of a silo.

Fig. 2 is a view in side elevation of the outer side of my novel structure.

Fig. 3 is a bottom plan view thereof.

Fig. 4 is a fragmentary section taken on the line 4—4 of Fig. 2.

Fig. 5 is an enlarged fragmentary vertical section taken substantially on the line 5—5 of Fig. 1.

Fig. 6 is a view in plan of the motor and driving connections, the hood thereof being shown in section.

Fig. 7 is a fragmentary view in side elevation, some parts being removed and some parts shown in section.

Referring with greater particularity to the drawings, the numeral 1 indicates in its entirety supporting structure, including a horizontally-disposed mounting plate 2 and depending longitudinally-extended laterally-spaced generally parallel side frame members 3 and 4, respectively, the former of which is designated as the innerframe member, and the latter the outerframe member. Extending transversely between the forward ends of the side frame members 3 and 4 and journaled for rotation therein, is a traction rotor 5, including a plurality of circumferentially-spaced radially-projecting elongated traction blades 6 equipped with serrations or teeth 7 on their extended edges. Extending transversely between said side frame members 3 and 4 and journaled for rotation therein on an axis parallel to but rearwardly spaced from the traction rotor 5, is a chopping rotor shaft 8. Intermediate the side frame members 3 and 4 an inboard chopping rotor 9 is secured to said shaft 8 for common rotation therewith. The chopping rotor 9 is provided with a plurality of longitudinally and circumferentially-spaced generally radially-projecting chopping blades 10, the planes of which are perpendicular to the axis of rotation of the shaft 8. As shown in Figs. 3 and 4, the shaft 8 projects through the side frame member 4 and terminates in a stub shaft portion 11 and is there provided with an outboard chopping rotor 12 which includes a plurality of circumferentially-spaced chopping blades 13 see Figs. 2, 3 and 4.

As shown particularly in Figs. 2, 3 and 4, an elongated guide element 14 projects laterally outwardly from the side frame member 4 in overlying relationship to the outboard rotor 12. Preferably, and as shown, the opposite ends of the guide frame converge with the side frame member 4 so as to permit the outboard rotor 12 to come as close as possible to the cylindrical wall X of the silo, as shown in Fig. 1. The guide-guard frame member 14 immediately above the rotor 12 projects laterally outwardly a slightly greater distance than the rotor 12, so as to prevent actual contact of the blades 13 thereof with the wall X.

As shown particularly by reference to Fig. 5, the rearward lower edges 3' of the side frame members 3 and 4 are each generally rounded and longitudinally forwardly curved downwardly, the intermediate portions 18 between the traction 5 and chopping 9 rotors are longitudinally forwardly inclined upwardly and act as silage engaging runners, and the forward lower edges 4' are rounded and longitudinally forwardly curved upwardly. It is to be noted that the radially lowermost portion 5' of the traction rotor extends below a plane A—A which is common to the portions of the laterally adjacent lower edges of the side frame members 3 and 4 and the radially lowermost portion 5' of the traction rotor 5 terminates in a substantially horizontal plane B—B which is tangent to the curved rearward lower edge portions 3' of the side frame members 3 and 4. The radially lowermost portion 9' of the chopping rotor 9 extends below the substantially horizontal plane B—B. Extending transversely between the side frame members 3 and 4 intermediate the rotors 5 and 9, is a shroud-acting baffle 15 which cooperates with a depending baffle 16 to deposit finely chopped silage Y downwardly immediately behind the device as it travels in the direction of the arrow (see Fig. 5). As shown at 17, the baffles 15 terminate slightly above the level of the lower runner-acting surfaces 18 of the side frame members 3 and 4, respectively.

A generally U-shaped handle member 19 is shown as removably secured to the baffle 16 through the medium of sockets 20 provided with set screws 21. As shown particularly by reference to Figs. 1, 2 and 5, the handle 19 projects upwardly, rearwardly and laterally inwardly at an angle oblique to the axis of the rotors 5 and 9. More specifically, handle 19 projects laterally in the direction of the side frame member 3 and away from the side frame member 4 and outboard rotor 12. Note by reference to Fig. 1, how this arrangement of handle permits the machine to hug the wall X with the axis of the rotors 5 and 9 in substantial alignment with a line radiating from the center of the silo. Rigidly secured to the upper surface of the mounting plate 2, preferably, and as shown, is an electric motor 22, having plug-in connections 23 to a source of electric power 24. Secured to the shaft 25 of the motor 22 is a sheave or pulley 26 and sprocket 27. Pulley 26 is connected to a pulley 28 on a reducing gear box 29 through the medium of a V-belt or the like 30. Projecting laterally from the gear reduction box 29 is a power shaft 31 to which is secured a sprocket 32 which has driving connections with the projected end of a shaft 33 associated with the traction rotor 5, through the medium of a chain 34 and sprocket 35 attached to the shaft 33. Extending transversely of the mounting plate 2, and suitably journaled in bearings 36, is an idler shaft 37 having a sprocket 38 rearwardly spaced from and in alignment with the sprocket 27 connected to shaft 25. Chain, or other driving connection, 39, runs over sprockets 27 and 38. Attached to the free end of shaft 37 is a smaller sprocket 40. A chain 41 runs over the sprocket 40 and another sprocket 42 in the extreme inner end of the chopping rotor shaft 8 exteriorly of side frame member 3. By this arrangement it will be seen that the traction rotor 5 is caused to rotate in a direction to impart forward movements to the machine; whereas, the chopping rotor is caused to rotate in the opposite direction but at a considerably greater speed.

Preferably, and as shown, the motor 22 and reduction gear box 23 are concealed within a hood 43, and the sprockets 32, 35, 40 and 42 are suitably concealed within a shroud 44, see Fig. 6.

As above indicated, my novel structure is self-propelling, the traction of the slow-rotating traction rotor 5 being sufficient to overcome the action of the rapidly-rotating chopping rotor 9. When it is desired to place the device in a silo, the handle 19 is removed by loosening the set screws 21 and the device is then of a size to place through the door of a silo, either in the side or roof thereof, so as to be in a position on top of the silage. The handle 19 is then placed in position, and the source of power 24 connected to the electric motor 22 through connection 23. The handle 19 is thereafter used solely to guide the machine over the surface area. When it is desired to chop up the silage adjacent the wall X of the silo, the device may be guided into tangential relationship with said wall and thereafter will work its way around the wall, as shown in Fig. 1, without guidance. The outboard rotor 12 works right up to the wall X, thereby eliminating manual chopping of the frozen silage away from the wall.

While I have described the commercial embodiment of my novel chopping machine, it should be obvious that the same is capable of considerable modification without departure from the spirit and scope of the invention as defined in the appended claims.

What I claim is:

1. A self-propelled skid-type runner mounted machine for chopping silage away from a cylindrical wall of a silo, said machine comprising, in combination, a supporting structure including a pair of longitudinally extending, vertically disposed, laterally spaced substantially parallel inner and outer side frame members having vertical lower edges, the lower edges of said side frame members each comprising a rear portion longitudinally forwardly curved downwardly, an intermediate portion longitudinally forwardly inclined upwardly and a forward portion longitudinally forwardly curved upwardly, said intermediate portion defining longitudinally extending silage engaging runners, a silage engaging traction rotor extending laterally between the side frame members and rotatably journaled therein with the radially lowermost portion of the traction rotor extending below a plane common to the portion of the lower edges laterally adjacent thereto and terminating in a substantially horizontal plane tangent to the rear portions of said edges, a silage chopping rotor extending laterally between the side frame members and journaled therein rearwardly of and in longitudinally spaced substantially parallel relation to the traction rotor with the radially lowermost portion of the chopping rotor extending below said substantially horizontal plane, a handle-guide member secured to said supporting structure and projecting therefrom longitudinally rearwardly at an angle oblique to the longitudinal axis of the rotors and laterally inwardly away from said outer side frame member toward said inner side frame member to cause the machine to hug and work in a desired position around and closely adjacent a cylindrical wall of a silo with the axis of one of the rotors substantially in alignment with a radius thereof, a power operated mechanism carried by the machine, means connecting said mechanism and said traction rotor for rotating the traction rotor in a given direction imparting motion to the machine and means connecting said mechanism to the chopping rotor for imparting rotation to the chopping rotor in a direction opposite to said given direction.

2. The structure defined in claim 1 wherein means are provided on said supporting structure for removably securing the handle-guide member thereon, whereby said member may be removed to facilitate the insertion of the machine into a silo.

3. The structure defined in claim 1 wherein a shaft journals said chopping rotor in said side frame members, said shaft extending laterally between said side frame members and having one end thereof projecting through the outer side frame member and terminating in a stub shaft portion outwardly thereof, an outboard chopping rotor mounted fast on said stub shaft portion outwardly of the outer side frame member, and a longitudinally extending guide-guard element mounted on said outer side frame member and projecting laterally outwardly therefrom, said guide-guard element overlying and extending laterally beyond said outboard rotor and comprising end portions converging from an intermediate portion to the side edges of said outer side frame member, said guide-guard element preventing contact between the outboard rotor and a cylindrical wall of a silo.

References Cited in the file of this patent

UNITED STATES PATENTS

| | | |
|---|---|---|
| 144,820 | Allen et al. | Nov. 25, 1873 |
| 398,648 | Paterson | Feb. 26, 1889 |
| 578,660 | Smith | Mar. 9, 1897 |
| 656,186 | Green | Aug. 21, 1900 |
| 1,050,923 | De Viese | Jan. 21, 1913 |
| 1,063,527 | Gaul | June 3, 1913 |
| 1,343,866 | Greene | June 15, 1920 |
| 1,593,948 | Monroe | July 27, 1926 |
| 2,049,661 | Pedersen | Aug. 4, 1936 |
| 2,273,120 | Lindskog | Feb. 17, 1942 |
| 2,410,465 | Small | Nov. 5, 1946 |
| 2,450,749 | Clark | Oct. 5, 1948 |
| 2,461,188 | Stoner | Feb. 8, 1949 |
| 2,633,789 | Ober | Apr. 7, 1953 |
| 2,634,962 | Eglitis | Apr. 14, 1953 |

FOREIGN PATENTS

| | | |
|---|---|---|
| 512,817 | France | Oct. 23, 1920 |
| 909,428 | France | Dec. 20, 1945 |
| 604,725 | Great Britain | July 8, 1948 |